March 3, 1936.   H. T. SEELEY   2,032,956
PROTECTIVE ARRANGEMENT
Filed Feb. 23, 1934
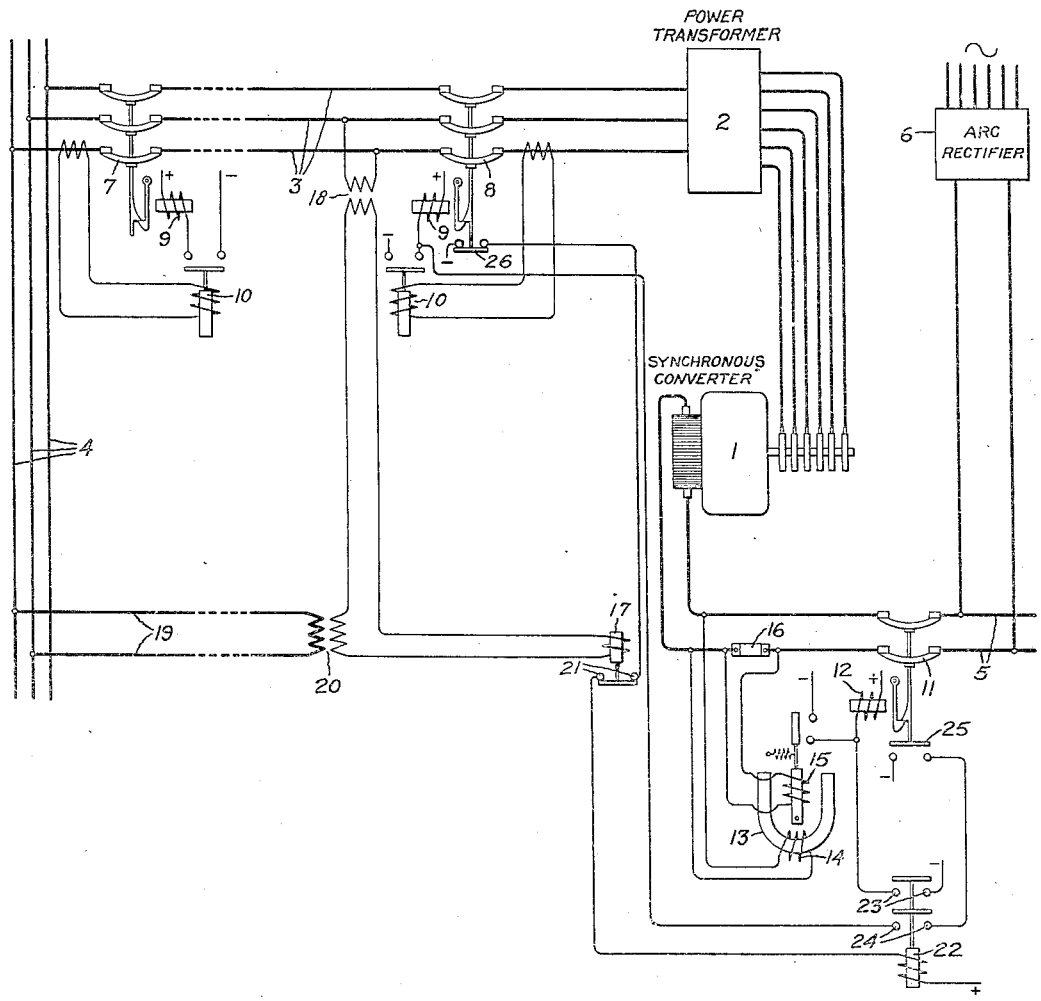
Inventor:
Harold T. Seeley,
by Harry E. Dunham
His Attorney.

Patented Mar. 3, 1936

2,032,956

UNITED STATES PATENT OFFICE 2,032,956

PROTECTIVE ARRANGEMENT

Harold T. Seeley, Yeadon, Pa., assignor to General Electric Company, a corporation of New York Application February 23, 1934, Serial No. 712,591

5 Claims. (Cl. 175—294)

My invention relates to improvements in protective arrangements for electric systems having synchronous converters and an object of my invention is to prevent damage to a converter in case of failure of the alternating current supply and also in case of subsequent reenergization when the supply is restored while the converter is running asynchronously with field excitation as a result of operating inverted, the dissipation of the stored energy of rotation or otherwise.

Synchronous converter installations are usually provided on the direct current side with means for disconnecting the converter from the direct current circuit upon a reversal of the direct current, that is flow of direct current into the converter. Even though the reverse current responsive means is set very sensitively to disconnect from the direct current circuit on "motoring current", the stored energy of rotation tends to maintain the converter in operation when the alternating current supply fails and the converter runs asynchronously until it finally comes to rest. If the alternating current supply is restored without following the normal starting procedure while the converter is operating asynchronously, damage is likely to follow.

Also if other rectifying apparatus having a voltage characteristic different from that of the converter, for example another rotary converter and some mercury arc rectifiers, are operated in parallel with the converter, the sensitive reverse current response causes difficulty. Thus, if the characteristic of the other apparatus is such that its voltage increases more rapidly on decreasing load than does the voltage of the converter, the latter is disconnected from the direct current circuit too frequently, and may not be instantly available in case of sudden loads. To avoid this, the sensitivity on reverse current response must be decreased. This sacrifices the protection because the converter operates inverted until the higher reverse current occurs and excessive speeds are likely if the alternating current supply fails under these conditions. Inasmuch as the number of inverted operations depends on the frequency of light load conditions, there are more opportunities for the converter to be motored at dangerous speeds. Also the hazard of restoration of alternating current supply after failure thereof is greater.

In accordance with my invention, I provide means for controlling the alternating current circuit or the direct current circuit or both in accordance with the phase relation between a standard or comparison voltage which may be derived from the alternating current source of supply and a voltage which is normally in synchronism with the first voltage and may be derived from the alternating current side of the converter so as to be dependent on the speed thereof. Thus, in accordance with my invention, it is possible to disconnect the alternating current source of supply whenever the predetermined voltage relation exists and thereby eliminate the danger of alternating current excitation at asynchronous speeds and also to prevent excessive speed from inversion, particularly at high current values whereby the frequent disconnection due to operating rectifying apparatus of different characteristics in parallel is avoided.

My invention in general relates to protective arrangements of the type disclosed and claimed in the copending application of Leland F. Stone, Serial No. 711,564 filed February 16, 1934, for Protective arrangement, and assigned to the same assignee as this invention.

My invention will be better understood from the following description when considered in connection with the accompanying drawing and its scope will be pointed out in the appended claims.

In the single figure of the accompanying drawing which diagrammatically illustrates a protective arrangement embodying my invention, a synchronous converter 1 is arranged to be connected through a power transformer 2 and a feeder circuit 3 to an alternating current source of supply indicated as a bus 4 and to supply a direct current circuit 5. Other rectifying apparatus such as an arc rectifier 6 suitably connected to operate in parallel with the converter 1 may also supply the direct current circuit 5.

For controlling the circuit of the feeder 3, which is shown partly in broken lines to give a concept of distance, there may be provided at the station where the bus 4 is located and also at the station where the converter 1 is located, suitable circuit interrupting means. For the sake of illustration these are shown as latched closed circuit breakers 7 and 8 each of which is provided with a trip coil 9 and any suitable fault responsive control means therefor such as overcurrent relays 10. Since these form no particular part of my invention, the fault responsive means have been shown for only one phase in order to simplify the drawing. Their application to the other phases is a matter well understood by the art.

For controlling the connection of the converter 1 to the direct current circuit 5 so as to prevent the flow of direct current above a predetermined amount into the converter, there may be provided suitable circuit interrupting means shown as a latched closed circuit breaker 11. This is provided with a trip coil 12 whose circuit is arranged to be controlled by suitable means such as a reverse current relay 13 having a polarizing or voltage winding 14 and a current controlling winding 15 connected across a resistance shunt 16.

In accordance with my invention, I provide means for disconnecting the converter 1 from one of its circuits and preferably both whenever the converter runs asynchronously. For this purpose I employ a simple relay 17 which is effective to trip the circuit breakers 11 and 8 whenever there is a predetermined phase difference between the voltage at the alternating current end of the converter and the comparison voltage derived from the alternating current source which supplies the converter. These voltages are, of course, normally in synchronism. The first of these two voltages may be derived from a potential transformer 18 connected to the alternating current end of the converter, as shown, while the second may be derived in any suitable manner independently of the feeder 3, as by an independent circuit 19 and a step-down transformer 20. These may be considered schematically to represent a so-called low voltage network system such as is frequently installed in metropolitan areas. Often the stations where the converters are installed have this network service so that the desired comparison voltage is readily available.

The relay 17 is connected in series in an energizing circuit which includes the secondaries of the transformers 18 and 20 connected in series with each other for additive electromotive forces. The relay 17 is thus in effect an undervoltage relay which is energized to close its contacts as long as the vector sum of the voltages at the alternating current end of the converter and the comparison voltage exceeds a certain value. As soon as this sum falls below this value, due to lack of synchronism between the converter and the source 4, the relay 17 drops out or opens its contacts 21.

In order that the relay 17 may, through its contacts 21, conveniently control the tripping of the circuit breakers 11 and 8, it can, as shown, complete the circuit of an auxiliary relay 22 which will remain energized as long as the converter is in synchronism. The auxiliary relay may be used to relieve the contacts of the relay 17 from the heavy duty incident to controlling trip coil circuits and also conveniently to provide multiple contacts if desired.

As shown, whenever, the auxiliary relay 22 is deenergized, it closes its contacts 23 in the circuit of the trip coil 12 of the direct current circuit breaker 11 and its contacts 24 in the circuit of the trip coil 9 of the alternating current feeder circuit breaker 8. In order to avoid any possibility of excessive motoring speeds during the opening period of the direct current circuit and also to prevent motoring until the circuit breaker 8 is closed, the circuit breakers 11 and 8 may be so interlocked that the former must open first and can only be maintained closed after the latter has been closed. One way this can be accomplished is to provide the circuit breaker 11 with an auxiliary switch 25 which closes when the circuit breaker is open and vice versa and which is in series in the circuit of the trip coil 9 of the circuit breaker 8.

Assuming a low load condition such that other rectifiers on the direct current circuit 5 may feed direct current into the converter, then no material harm will occur so long as the alternating current circuit to the converter is intact since the converter will merely tend to feed the source 4. However, if the reverse current exceeds the value for which the relay 13 is set to operate, the direct current circuit breaker 11 will be tripped. This tripping, however, will not be effected under the usual changes in load conditions and the frequency of operation of the circuit breaker 11 will be reduced.

Assuming, however, that for some reason, for example the opening of the circuit breaker 7, the alternating current supply of the converter is interrupted, then the direct current tends to motor the converter at speeds which may be dangerous. If there is sufficient reverse current, the relay 13 may again effect the opening of the circuit breaker 11. Regardless of whether it does or not, the converter being in motion tends to supply an alternating current and the voltage derived from the potential transformer 18 will no longer be in phase with the comparison voltage derived from the circuit 19 and transformer 20. As soon as the phase difference causes the sum of the voltages to decrease to an amount below that which will energize the relay 17 sufficiently to maintain its contacts closed, the relay will drop out thereby deenergizing the auxiliary relay 22. This relay, upon the closing of its contacts 23 and 24, will effect the tripping of the circuit breaker 11 if it has not already been tripped and insure the tripping of the circuit breaker 8 as soon as the auxiliary switch 25 is closed. Inasmuch as the relay 17 cannot reclose its contacts until the sum of the voltages supplied thereto exceeds a predetermined amount or, in other words, a desired phase relation obtains, it will be obvious that any attempt to reclose the circuit breakers 8 and 11 until the sources 3 and 19 are operating synchronously will fail because the auxiliary relay 22, being deenergized, will immediately trip the circuit breakers 8 and 11.

If, while the feeder 3 is energized, the circuit breaker 8 opens, an associated auxiliary switch 26, closed when the circuit breaker is closed, will open the circuit of the auxiliary relay 22 and thereby prevent the motoring of the converter by causing the opening of the circuit breaker 11.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. A synchronous converter, an alternating current circuit for supplying said converter, a direct current circuit to be supplied by said converter and a single winding means responsive to the phase relation between a voltage corresponding to the speed of the converter and a comparison voltage normally in synchronism with the first voltage for effecting the disconnection of the converter from one of said circuits on the occurrence of a predetermined phase relation between said voltages.

2. A synchronous converter, an alternating current circuit for supplying said converter, a direct current circuit to be supplied by said converter, means for deriving a voltage at the alternating current end of the converter, means for deriving a voltage from the alternating current source supplying the converter, a relay for effecting the disconnection of the converter from one of said circuits on the occurrence of a predetermined phase relation between said voltages and an energizing circuit for said relay including said voltage deriving means connected in series with each other for cumulative electromotive forces when the derived voltages are in phase and in series with the energizing winding of the relay.

3. A synchronous converter, an alternating current circuit for supplying said converter, a direct current circuit to be supplied by the converter, means for deriving a voltage at the alternating current end of the converter, means for deriving a voltage from the alternating current source supplying the converter normally in synchronism with the first voltage and means responsive to the phase relation between said voltages for effecting the disconnection of the converter from said circuits including a relay having a winding connected to be energized in accordance with the vector sum of said voltages.

4. A synchronous converter, an alternating current circuit for supplying said converter, a direct current circuit to be supplied by said converter and a single winding means responsive to the phase relation between a voltage corresponding to the speed of the converter and a comparison voltage normally in synchronism with the first voltage for effecting the disconnection of the converter from said circuits including means for disconnecting the converter from said circuits in a predetermined sequence on the occurrence of a predetermined phase relation between said voltages.

5. A synchronous converter, an alternating current circuit for supplying said converter, a direct current circuit to be supplied by the converter and means for controlling the connections of the converter to said circuits including a relay having a winding connected to be energized in accordance with the vector sum of a voltage corresponding to the speed of the converter and a comparison voltage normally in synchronism with the first voltage, auxiliary means controlled by said relay for effecting the disconnection of the converter from the direct current circuit when the sum of said voltages is less than a predetermined value and means responsive to the disconnection of the direct current circuit and controlled by said auxiliary means for effecting the disconnection of the converter from the alternating current circuit.

HAROLD T. SEELEY.